March 18, 1924.
H. H. HELLER
PRODUCTION METER
Filed Feb. 5, 1921     2 Sheets-Sheet 1
1,487,516
Fig. 1.
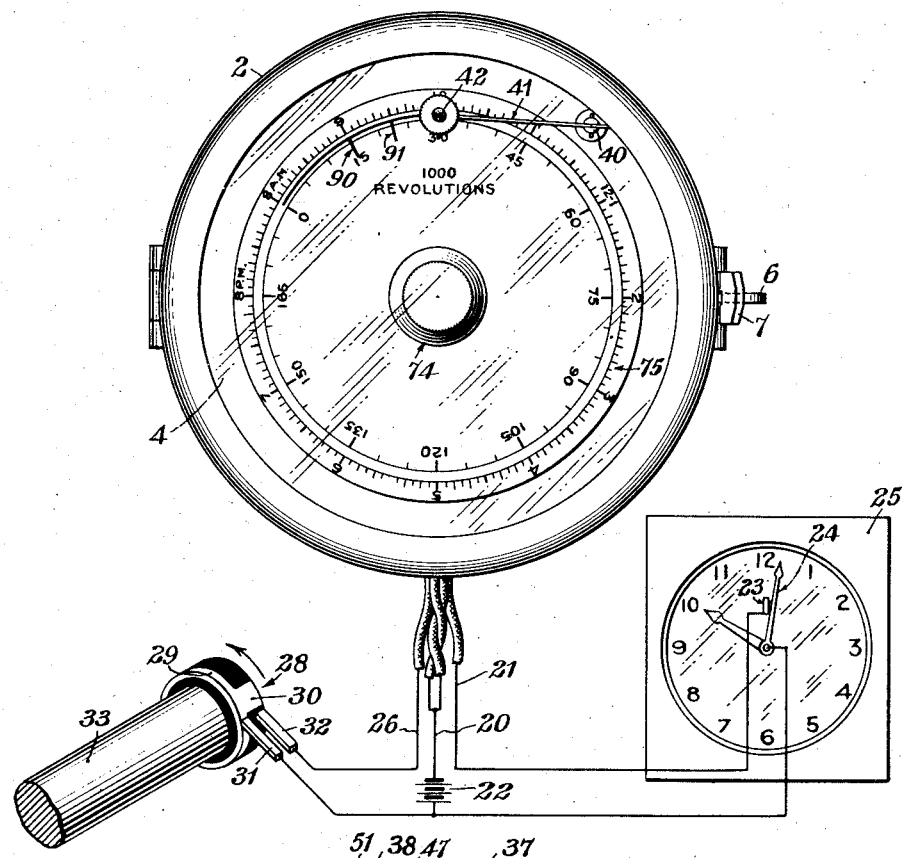
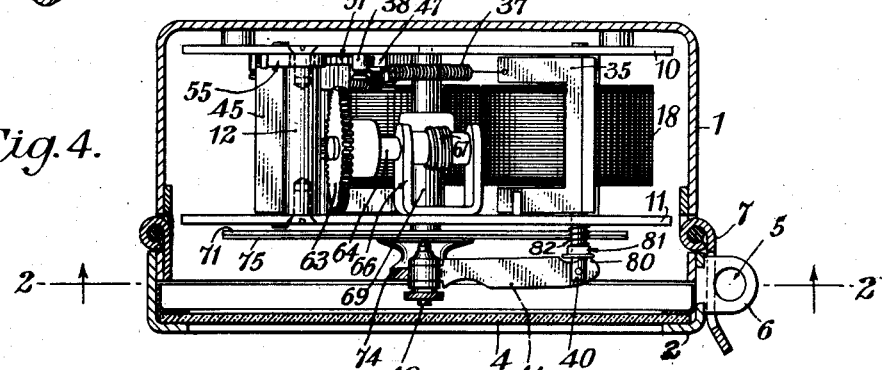
Fig. 4.
INVENTOR
H. H. Heller.
BY
Moakley and Gill
ATTORNEYS.

March 18, 1924. 1,487,516
H. H. HELLER
PRODUCTION METER
Filed Feb. 5, 1921  2 Sheets-Sheet 2

H. H. Heller, INVENTOR
BY Moakley and Gill
ATTORNEYS.

Patented Mar. 18, 1924.

1,487,516

UNITED STATES PATENT OFFICE.

HARLEY HOWARD HELLER, OF NEW YORK, N. Y., ASSIGNOR TO FORD INSTRUMENT COMPANY, INC., A CORPORATION OF NEW YORK.

PRODUCTION METER.

Application filed February 5, 1921. Serial No. 442,773.

*To all whom it may concern:*

Be it known that I, HARLEY HOWARD HELLER, residing at New York, in the county of New York, State of New York, have invented certain new and useful Improvements in Production Meters; and I do hereby declare the following to be a full, clear, and exact description of the invention, such as will enable others skilled in the art to which it appertains to make and use the same.

This invention relates to meters and more particularly to the type of meter which gives an indication or record of the successive amounts of work performed by a machine in successive time intervals.

The invention has for its object the provision of a meter of this character which is of a simple construction and which may be readily attached to any of the types of the existing machines.

In its preferred form, the record sheet is driven by the machine to which the instrument is attached and the pencil is normally stationary but is momentarily actuated at definite time intervals to indicate on the record sheet the total displacement of a moving part of the machine which will be a measure of the amount of work performed in the preceding time interval.

The invention will also be clear from the detailed description hereinafter to follow and will be particularly pointed out in the appended claims.

In the drawings,

Figure 1 shows a face view of the meter and its electrical connections.

Figure 4 is a section through Figure 2 on the line 4—4, and

Figure 2:
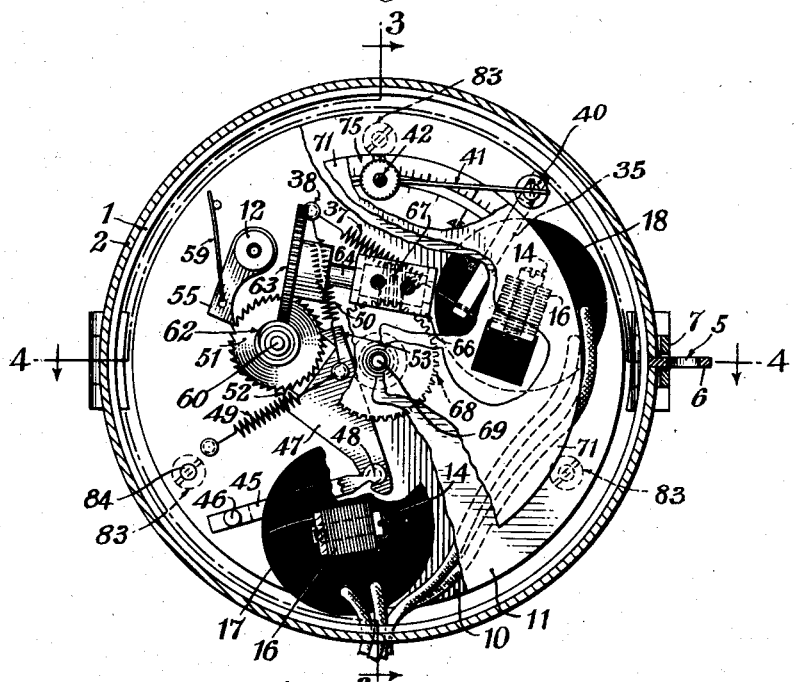
Figure 2 is a view similar to Figure 1 with the cover plate and other portions of the mechanism broken away to more clearly show the parts.
Figure 3:
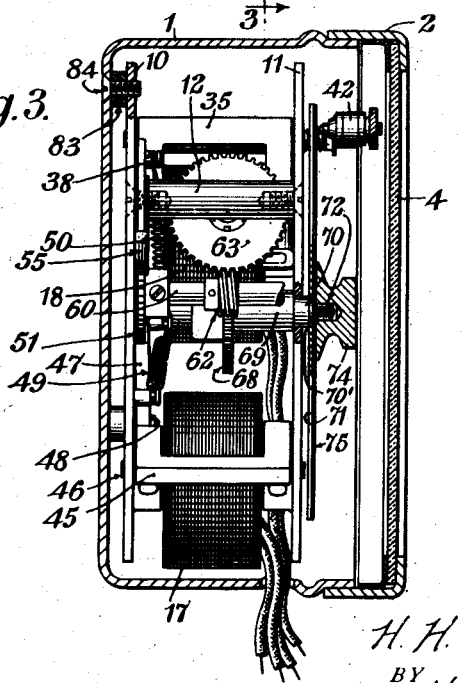
Figure 3 is a section through Figure 2 on the line 3—3.
Figure 5:
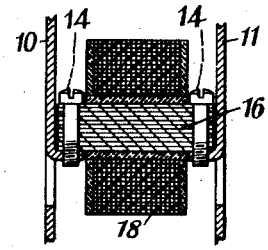
Figure 5 is a sectional detail view.

The meter as a whole is enclosed within a casing 1 having a hinged cover 2, which is provided with a large central opening in its face closed by a glass or other transparent plate 4. The two parts of the casing are adapted to be locked together to prevent tampering with the mechanism by means of a padlock not shown, which passes through an eye 5 formed in a lug 6 carried by the cover plate 2 over which lug a slotted strap 7 carried by the body 1 of the casing is adapted to fit. The mechanism which is removable as a whole from the casing is supported by two plates 10 and 11 which are held in spaced relation by a post 12, and the laminated cores 16 of the two electromagnets. As shown in Figure 5, ears are formed in the plates by forming U shaped slots in the same and bending inwardly the separated sections. The cores 16 of the electromagnets are attached to these ears by means of screws 14. There are two electromagnets shown in the construction disclosed, the coils being designated 17 and 18. The coil 18 is connected by means of wires 20 and 21 to a battery 22 shown diagrammatically in Figure 1. This circuit is normally open and is closed momentarily by means of a contact 23 which is engaged by the minute hand 24 of a clock 25, the disclosure being diagrammatic and it being evident that any other type of time controlled circuit controller may be used.

The coil 17 of the other electromagnet is connected by means of wires 20 and 26 to the battery 22 and a circuit controller 28 which comprises a slip ring 29, a segmental contact 30, and two brushes 31 and 32 connected to the wires 20 and 26 respectively from which it will be evident that for each revolution of the shaft 33 upon which slip ring and contact is mounted, the circuit through the coil 17 will be closed to energize it momentarily.

The energization of the coil 18 actuates an armature 35 comprising a U shaped piece pivoted adjacent the ends of its legs by means of trunnions to the plates 10 and 11. Connected to one of the legs of the armature adjacent its outer end is a spring 37, the other end of which is secured to a pin 38 carried by the plate 10. This spring 37 normally pulls the armature away from the core of the magnet 18 but when the same is energized, the armature will be attracted against the tension of the spring. The armature 35 is pivoted on trunnions, one of which, 40, carries an arm 41, the armature 35 and the arm 41 forming a bell-crank. At the outer end of the arm 41 is mounted a pencil 42 which is of any desired construction.

The energization of the magnet 17 actuates an armature 45 which is pivoted at 46.

This armature is also of a U shape and secured to one end of it is a floating pallet 47, the armature and pallet being pivoted together as at 48. This pallet is maintained normally in position by two springs 49 and 50 which springs urge the pallet against a ratchet wheel 51. The pallet is provided with two pawls 52 and 53 both of which engage the teeth of the ratchet wheel 51. When the coil 17 is energized, the actuation of the armature 45 will pull the pallet 47 away from the wheel sufficient to cause the pawl 52 to engage the next successive tooth and upon de-energization of the magnet, the spring 50 will cause the pawl 52 to actuate the ratchet wheel one tooth, the pawl 53 limiting the actuation of the ratchet wheel to one tooth as is the usual manner of construction. To prevent the rotation of the ratchet wheel in the opposite direction to which it is driven by the pallet 47, an additional pawl 55 may be provided which is pivoted upon a reduced end of the post 12 as is shown in Figure 4, the pawl being maintained against lateral movement by the plate 10 and the shoulder formed upon post 12. A leaf spring 59 normally urges this pawl against the teeth of the ratchet wheel 51. The ratchet wheel 51 is carried by a shaft 60 supported in bearings in plates 10 and 11, which shaft also carries a worm 62 which drives a worm wheel 63. The worm wheel 63 is mounted upon a shaft 64 which is supported by a U shaped bracket 66 secured to the plate 11 as is most clearly seen in Figure 4. The shaft 64 also carries a worm 67 which meshes with a worm wheel 68 secured to the central shaft 69 of the mechanism. This shaft 69 is supported in bearings formed in the plates 10 and 11, the portions of the shaft passing through the plates being of reduced diameter and the shoulders thus formed prevent any longitudinal displacement. One of these reduced end portions is shown at 70 and the construction at the other end of the shaft is similar. The reduced end portion 70 carries a metal disc 71 which is provided with a central opening and the extreme portion 72 of the shaft which is of less diameter than the part 70 is threaded and passes through the opening in the disc 71. The disc 71 is clamped in position by a nut 74 which forces the disc against a shoulder 70'.

The metallic disc 71 is adapted to carry the record sheet 75 which is circular in shape and upon which suitable charts may be printed as for example in Figure 1, this record sheet is provided with a circular chart of equal divisions each one of which corresponds to 5000 revolutions of the shaft 33. Surrounding the circular chart with a space therebetween is an annular chart which is also divided into equal divisions corresponding to the time intervals of a working day, as for example, this chart may designate time intervals from 8 a. m. to 12 noon and then leave out an hour for lunch and then designate time intervals from 1 to 8 p. m. although any other type of chart may be used if desired.

In order that the chart or record sheet 75 may be readily removable which is accomplished by removing the nut 74 and replacing the record sheet with a new fresh one when desired, the arm 41 which carries the pencil 42, is preferably mounted in a slot formed in the trunnion 40 carried by the armature 35. The arm 41 has a shoulder 80 extending beyond this pivotal point upon which a sliding disc 81 mounted upon the trunnion 40 is adapted to bear, pressure being placed upon this disc by means of a spring 82, the spring being of sufficient strength to hold the pencil 42 firmly against the paper so that it may clearly trace its record. However, when replacing a used record with a fresh one, the arm 41 may be swung away from the record so that the record sheet 75 will be more accessible. The entire mechanism described is removably mounted in the casing 1, on posts 83 secured to the plate 10 and the bottom of the casing by screws 84.

To use the meter, the circuit controller consisting of the parts 28, 29, etc., is mounted upon a rotating shaft whose total displacement it is desired to measure and the other circuit is connected to the time controlled device as described, the meter is then ready for operation and as the shaft 33 rotates the record is correspondingly driven through the electro-magnet mechanism describe. As the record sheet revolves, the pencil 42 will trace a record of the number of revolutions of the shaft as shown by the heavy black line in Figure 1 and at the end of successive time intervals the closure of the time controlled circuit will cause a momentary actuation of the pencil 42 in a substantial radial direction and will thus indicate the termination of a definite time interval. Thus, there is generated on the chart a time scale comprising the above components of finished work. In the chart shown in Figure 1, the divisions of the time scale are spaced apart in accordance with the average efficiency at which the machine should be operated, as for example, the machine should make in the particular chart shown 15,000 revolutions per hour and from the heavy black line designated 90, the chart indicates that the machine has operated during the first hour of the day or from 8 to 9 a. m. at the average speed required of it in order to perform a definite amount of work within the working day. The second black line which is designated 91 shows that during the second hour, the machine has only made 7,500 revolutions which will bring the mark opposite the mark corresponding to a time 9:30 a. m. instead of 10 o'clock. The workman will then realize that his machine is one half hour behind its normal output and that at the end of the day unless he is able to make up this lost time the machine has not performed the amount of work which it normally should do. It is therefore evident that the chart gives not only a record of the work performed by the machine in successive time intervals but also compares the work performed during each interval with the amount which the machine should do under normal working conditions. If desired, these intervals may be of less duration than an hour.

It is evident from the preceding description that the total displacement of a moving part of the machine is regarded as a measure of the quantity of work performed by the machine. This is strictly true in the case of full automatic machines where the output can be measured by the speed of the machine; with semi-automatic or hand operated machines this rule may not apply strictly, but in most instances it will be substantially correct if the operator operates the machine properly and in such instances where he does not a check may be easily obtained by comparing the output from the machine with the record obtained by the meter.

I claim:

1. In an instrument of the class described, a chart bearing predetermined indications of steps of work and of time intervals allotted to individual work-steps, a marker arranged to bear on said chart, means responsive to recurring displacement of a moving part of a machine operable to move said chart, and time-controlled means for operating said marker, the combined movement of said chart and marker generating a time scale comparatively related to said predetermined indications.

2. In an instrument of the class described, a revoluble support, a marker directed thereat, a chart carried by said support and interposed between the same and said marker, said chart bearing a graphic schedule of different mutually measuring components of work, means for driving said support in accordance with the moving part of a machine, time-controlled means operable to momentarily displace said marker and to co-act with said support-driving means to cause said marker to generate a record of like work components measurable by said schedule.

3. In an instrument of the class described, a marker, a revoluble chart support positioned opposite to said marker, a chart carried by said support and bearing predetermined time and work scales, means for driving said support in accordance with the recurring displacements of a moving part of a machine whereby said marker will trace a record on the chart of the displacements of its support, and time-controlled means for momentarily displacing the marker to record time intervals upon the chart.

4. In an instrument of the class described, a marker, a revoluble chart support positioned opposite to said marker, a chart carried by said support and bearing predetermined time and work scales, electromechanical means for driving said support having a circuit controllable by the recurring displacements of a moving part of a machine whereby said marker will trace a record on the chart of the displacements of its support, and electrically operated time-controlled means for momentarily displacing the marker to record upon the chart successive time intervals.

5. In an instrument of the class described, a revoluble support, a chart upon said support, said chart having a predetermined work scale and a predetermined time scale thereon, electromechanical means for driving said support in accordance with the recurring displacements of a moving part of a machine, a marker for tracing a record on said chart of the displacements of said support and electrically operated time controlled means for momentarily displacing the marker to record successive time intervals upon said chart.

6. In an instrument of the class described, a revoluble support, a chart upon said support having a predetermined work scale thereon, a predetermined time scale on said chart arranged in co-operating relation to said work scale and having its divisions arranged to indicate the time interval normally required to perform a determined amount of work, electromechanical means for driving said support in accordance with the work performed by a machine, a marker for tracing a record of the displacement of said support upon said chart and electrically operated time controlled means for momentarily displacing the marker to record successive time intervals whereby the trace recorded shows a comparison between the actual work done and the amount of work which should be done in a determined time interval.

7. In an instrument of the class described, a revoluble support, a chart upon said support having two predetermined annular scales thereon, one indicating the recurring displacements of a moving part of a machine and the other time intervals, said scales being divided to show the normal total displacements of the part of the machine in successive time intervals, electromechanical means for driving said support in accordance with the recurring displacements of the moving part of the machine, a marker for tracing a record upon said chart of the displacements of said support and time controlled means for momentarily displacing the marker to record successive time intervals whereby a comparison may be made of the total actual displacements of the moving part of the machine with the estimated displacements of said part.

8. In an instrument of the class described, predetermined mutually measuring time and work-schedule scales having succeeding subdivisions identified by value-designations denoting progressive summations, an inscription surface adjacent to said scales, a marker, means responsive to recurring displacement of a moving part of a machine to effect relative displacement of said marker and inscription surface, and time-controlled means co-operative therewith to generate a time scale in relation to said other scales to give direct quantitative readings in combination therewith.

9. In an instrument of the class described, a revoluble support, a chart carried thereby bearing predetermined mutually measuring time and work-schedule scales graduated in accordance with progressive summations identified by value-designations, a marker, means for driving said support in accordance with a moving part of a machine, and time-controlled means adapted to momentarily displace said marker and co-act with said support-driving means to generate a time scale readable against the value designations of said other scales to give summation and comparative readings of work.

10. In an instrument of the class described, a support, a chart carried thereby bearing predetermined parallel mutually measuring scales respectively graduated in accordance with progressive numerically identified summations of time and work-steps, means for actuating said support in response to recurring displacements of a moving part of a machine, a marker, and time-controlled means operable to momentarily displace the marker to record time intervals on the chart readable against the numerical identifications of said scales to give comparative summation readings of work.

11. In an instrument of the class described, a revoluble support, a chart carried thereby bearing predetermined mutually measuring time and work-schedule scales graduated in accordance with progressive evaluated summations, electro-mechanical means for driving said support in accordance with recurring displacements of a moving part of a machine, a marker, and electrically operated time-controlled means adapted to momentarily displace said marker and to co-act with said support-driving means to generate a time scale readable against the evaluated scales to give comparative summation readings of work.

12. In an instrument of the class described, a revoluble support operable in accordance with work accomplishment, a chart upon said support provided with predetermined work-schedule and time scales having coincident initial graduations and mutually measuring subsequent progressively evaluated graduations, a marker, electro-mechanical means for co-operatively actuating said support and marker to generate a scale sub-divided in accordance with work accomplishment to read in terms of time against the evaluations of said predetermined scales.

In testimony whereof I affix my signature.

HARLEY HOWARD HELLER.